(12) United States Patent
Gotoh (10) Patent No.: US 10,251,217 B2
(45) Date of Patent: Apr. 2, 2019

(54) MOLYBDENUM DISILICIDE-BASED CERAMIC HEATING ELEMENT HOLDING STRUCTURE

(71) Applicant: SANDVIK KK, Hyogo (JP)

(72) Inventor: Kazutaka Gotoh, Hyogo (JP)

(73) Assignee: Sandvik KK, Hyogo (JP)

( * ) Notice: Subject to any disclaimer, the term of this patent is extended or adjusted under 35 U.S.C. 154(b) by 510 days.

(21) Appl. No.: 14/897,773

(22) PCT Filed: Jun. 16, 2014

(86) PCT No.: PCT/JP2014/003214
§ 371 (c)(1),
(2) Date: Dec. 11, 2015

(87) PCT Pub. No.: WO2014/199647
PCT Pub. Date: Dec. 18, 2014

(65) Prior Publication Data
US 2016/0113062 A1 Apr. 21, 2016

(30) Foreign Application Priority Data

Jun. 14, 2013 (JP) .................................. 2013-126151

(51) Int. Cl.
*H05B 3/06* (2006.01)
*C03B 29/00* (2006.01)
(Continued)

(52) U.S. Cl.
CPC ............... *H05B 3/06* (2013.01); *C03B 29/00* (2013.01); *C04B 35/58092* (2013.01);
(Continued)

(58) Field of Classification Search
CPC ............ C03B 29/00; C04B 2235/3427; C04B 2235/36; C04B 2235/80; C04B 2235/94;
(Continued)

(56) References Cited

U.S. PATENT DOCUMENTS 1,233,183 A * 7/1917 Carter .................. H01C 3/10
338/281
1,459,801 A 6/1923 Smalley
(Continued)

FOREIGN PATENT DOCUMENTS

DE     759444     *   5/1953
DE     759444 C    5/1953
(Continued)

OTHER PUBLICATIONS

Office Action dated Jun. 19, 2018, issued in corresponding Japanese Patent Application No. 2015-560428.

*Primary Examiner* — Ibrahime A Abraham
*Assistant Examiner* — Frederick F Calvetti
(74) *Attorney, Agent, or Firm* — Morgan, Lewis & Bockius LLP (57) ABSTRACT

A molybdenum disilicide-based ceramic heating element holding structure includes a holding member that is attached to a base portion and that holds an elongated support member, for mounting a molybdenum disilicide-based ceramic heating element of an elongated shape at intervals in a long axis direction thereof. The molybdenum disilicide-based ceramic heating element mounted on the support member can be exchanged without breaking the holding structure. A plurality of elongated support members can be provided, and a U-shaped portion of an elongated molybdenum disilicide-based ceramic heating element having a meandering shape can be inserted and extracted from a uniaxial direction in a space partitioned by the base portion. The plurality of support members and the holding member holding the plurality of elongated support members are detachable and the support member is removable from the holding member.

11 Claims, 9 Drawing Sheets

(51) Int. Cl.
*H05B 3/16* (2006.01)
*H05B 3/24* (2006.01)
*H05B 3/66* (2006.01)
*C04B 35/58* (2006.01)
*H05B 3/14* (2006.01)
*H05B 3/46* (2006.01)

(52) U.S. Cl.
CPC ............... *H05B 3/141* (2013.01); *H05B 3/16* (2013.01); *H05B 3/24* (2013.01); *H05B 3/46* (2013.01); *H05B 3/66* (2013.01); *C04B 2235/3427* (2013.01); *C04B 2235/36* (2013.01); *C04B 2235/80* (2013.01); *C04B 2235/94* (2013.01); *H05B 2203/003* (2013.01)

(58) Field of Classification Search
CPC ........ C04B 35/58092; H05B 2203/003; H05B 3/06; H05B 3/141; H05B 3/16; H05B 3/24; H05B 3/46; H05B 3/66; H05B 2203/018
USPC .................................................. 219/536, 537
See application file for complete search history.

(56) References Cited

U.S. PATENT DOCUMENTS

| | | | | | |
|---|---|---|---|---|---|
| 1,719,888 | A | * | 7/1929 | Ipsen | H05B 3/66 373/128 |
| 1,730,103 | A | * | 10/1929 | Weintz | H05B 3/66 373/117 |
| 3,373,239 | A | * | 3/1968 | Rubisch | F27D 11/02 219/402 |
| 3,612,827 | A | * | 10/1971 | Dills | H05B 3/748 219/455.11 |
| 3,673,387 | A | * | 6/1972 | Drugmand | G03G 15/2007 219/216 |
| 3,818,185 | A | * | 6/1974 | Aoki | G03G 15/2007 219/388 |
| 3,984,615 | A | * | 10/1976 | Beck | H05B 3/64 219/406 |
| 4,161,648 | A | * | 7/1979 | Goessler | H05B 3/748 219/461.1 |
| 4,262,192 | A | * | 4/1981 | Giler | H05B 3/748 219/461.1 |
| 4,299,364 | A | | 11/1981 | Loniello | |
| 4,337,390 | A | * | 6/1982 | Best | H05B 3/32 174/138 J |
| 4,829,282 | A | * | 5/1989 | Waugh | H01C 3/10 338/279 |
| 4,894,515 | A | * | 1/1990 | Hurko | F24C 15/102 219/461.1 |
| 4,998,006 | A | * | 3/1991 | Perlman | F24D 13/02 219/212 |
| 5,029,231 | A | * | 7/1991 | Carr | F24D 13/022 219/542 |
| 5,324,920 | A | * | 6/1994 | Nakao | C30B 25/10 219/385 |
| 5,335,310 | A | * | 8/1994 | Novy | F27D 99/0006 219/532 |
| 5,749,233 | A | * | 5/1998 | Adolfsson | B01F 3/04808 222/129.1 |
| 5,753,892 | A | * | 5/1998 | Gross | H05B 3/748 219/461.1 |
| 6,160,957 | A | * | 12/2000 | Johansson | H05B 3/16 219/536 |
| 6,624,398 | B2 | * | 9/2003 | Sherrill | H05B 3/06 219/536 |
| 7,378,621 | B2 | * | 5/2008 | Johansson | H05B 3/148 219/211 |
| 2014/0014265 | A1 | * | 1/2014 | Privett | H01C 17/06 156/306.3 |
| 2014/0343747 | A1 | * | 11/2014 | Culbertson | G05D 23/19 700/300 |
| 2016/0278165 | A1 | * | 9/2016 | Emami | H05B 3/66 |

FOREIGN PATENT DOCUMENTS

| | | |
|---|---|---|
| EP | 0331880 A | 9/1989 |
| FR | 2455257 A1 | 11/1980 |
| GB | 1256320 A | 12/1971 |
| JP | S57-23782 A | 2/1982 |
| JP | H10-324571 A | 12/1998 |
| WO | 2001110101 A1 | 12/2004 |
| WO | WO2004110101 * | 12/2004 |
| WO | WO2004112433 * | 12/2004 |

* cited by examiner (Prior Art)
FIG. 1

MOLYBDENUM DISILICIDE-BASED CERAMIC HEATING ELEMENT HOLDING STRUCTURE

RELATED APPLICATION DATA

This application is a § 371 National Stage Application of PCT International Application No. PCT/JP2014/003214 filed Jun. 16, 2014 claiming priority of JP Application No. 2013-126151, filed Jun. 14, 2013.

TECHNICAL FIELD

The present invention relates to a holding structure for a molybdenum disilicide ($MoSi_2$)-based ceramic heating element.

BACKGROUND $MoSi_2$-based ceramic heating elements are used in semiconductor devices and manufacturing devices for glass and the like because they excel in heat resistance compared to metal heating elements and other ceramic heating elements. $MoSi_2$-based ceramic heating elements can be heated to high temperatures of 1,600 to 2,000 degrees C., and can achieve a high surface power density of up to about 20 W/cm$^2$.

Because the $MoSi_2$-based ceramic heating elements lack strength and soften at high temperatures, $MoSi_2$-based ceramic heating elements of an elongated shape cannot be freely held by one end thereof alone. The $MoSi_2$-based ceramic heating elements need to be held at predetermined intervals on a substrate such as a heat-insulating material.

Figure 1:
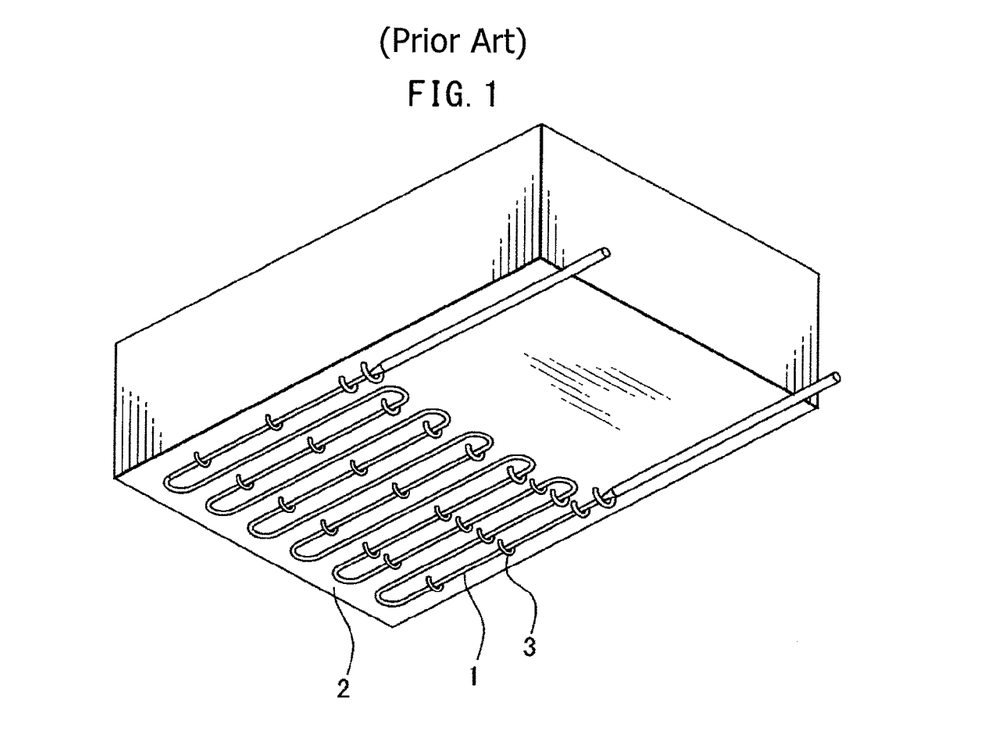
FIG. 1 illustrates a conventional heating element holding unit.

In a situation where the $MoSi_2$-based ceramic heating elements are held facing down on a ceiling side in a heating furnace, a structure is known where the $MoSi_2$-based ceramic heating element (1) is attached to the heat-insulating material (2) using staple U-pins (3), as seen in FIG. 1. By making the heat-insulating material (2), to which the $MoSi_2$-based ceramic heating element (1) is attached, a unit of a ceramic fiberboard, a heating furnace can be easily constructed using this unit. In this heating element attachment structure, because the $MoSi_2$-based ceramic heating element is adhesively fixed to an insulating material with many staples, it is difficult to exchange the heating element alone when the heating element becomes degraded or damaged. However, in the structure illustrated in FIG. 1, the unit of the ceramic fiberboard attached with the $MoSi_2$-based ceramic heating element can be replaced as a unit. Alternatively, while it is not impossible to break all of the staples, repair holes and reattach staples, this requires labor and a plurality of exchanges is realistically impossible.

SUMMARY OF INVENTION

In the conventional technology illustrated in FIG. 1, it is difficult to exchange the $MoSi_2$-based ceramic heating element alone because of the attachment structure of the $MoSi_2$-based ceramic heating element. If the heating element alone can be exchanged, this is desirable from a viewpoint of cost and labor. Moreover, if the $MoSi_2$-based ceramic heating element is fixed with many staples, it involves a burden of a manufacturing these staples and a large cost. Moreover, such a heating element unit is inconvenient in that it is difficult to exchange while heated to a high temperature, since the operation of the heating furnace needs to be stopped in order to exchange the heating element unit. Moreover, if the heating element is fixed with many staples, there is a risk of damage due to expansion and contraction of the heater while heated.

In view of the above described problems of the conventional technology, the objects of the present invention are to enable exchanging a $MoSi_2$-based ceramic heating element independently as a heating element, to enable exchange while heated, and to reduce the risk of damage by raising a degree of freedom of movement of a fixing point of the heater.

The present invention that achieves the above objects resides in the following.

(1) A molybdenum disilicide-based ceramic heating element holding structure, comprising:

one or more elongated support members for supporting a molybdenum disilicide-based ceramic heating element of an elongated shape by mounting the molybdenum disilicide-based ceramic heating element of an elongated shape at locations along a long axis direction thereof and a plurality of first holding members for holding each elongated support member at two or more locations in a long axis direction of each elongated support member, where the plurality of first holding members are held by one or more second holding members or held by a base portion of a holding structure, and the elongated molybdenum disilicide-based ceramic heating element mounted on the elongated support member can be exchanged without breaking a heating element holding structure.

(2) The molybdenum disilicide-based ceramic heating element holding structure according to (1) above, where a plurality of the elongated support members are provided, and the elongated molybdenum disilicide-based ceramic heating element is exchangeablly held without breaking the heating element holding structure by being able to be inserted and extracted a U-shaped portion of an elongated molybdenum disilicide-based ceramic heating element of a meandering shape from a uniaxial direction in a space defined by the base portion or the second holding member, the plurality of elongated support members, and the plurality of first holding members.

(3) The molybdenum disilicide-based ceramic heating element holding structure according to (1) or (2) above, where the elongated support member(s) is/are detachablly held by the first holding members, and by detaching the elongated support member(s) from the holding members, the elongated molybdenum disilicide-based ceramic heating element can be exchanged without breaking the holding structure.

(4) The molybdenum disilicide-based ceramic heating element holding structure according to (1) to (3) above, where a frame body opened in both upward and downward directions is provided as the second holding member or the base portion, and both the upward and the downward directions of the frame body can be heated by the elongated molybdenum disilicide-based ceramic heating element mounted to the elongated support member.

(5) The molybdenum disilicide-based ceramic heating element holding structure according to (1) to (3) above, where the second holding members are of an elongated shape, and the plurality of first holding members holding each of the plurality of elongated support members are held in a series by the second holding members of the elongated shape.

(6) The molybdenum disilicide-based ceramic heating element holding structure according to (5) above, where a frame body opened in at least one direction from among upward and downward directions is provided separately from the second holding members of the elongated shape, the second holding members are held in the frame body, the at least one direction of the frame body is made able to be heated by the elongated molybdenum disilicide-based ceramic heating element mounted to the elongated support member, and the second holding members can be removed from the frame body together with the first holding members and the elongated support members.

(7) The molybdenum disilicide-based ceramic heating element holding structure according to any of (1) to (6) above, wherein the elongated support members comprises a plurality of molybdenum disilicide-based ceramic elements which are electrically insulated from each other, the molybdenum disilicide-based ceramic heating element being mounted in such a manner as to directly contact with the molybdenum disilicide-based ceramic elements.

(8) The molybdenum disilicide-based ceramic heating element holding structure according to (1) to (6) above, wherein the elongated support members are an elongated support member made of an electrically insulating ceramic that houses elements of a molybdenum disilicide-based ceramic, the molybdenum disilicide-based ceramic elements are electrically insulated from each other, and the molybdenum disilicide-based ceramic heating element is mounted in such a manner as to directly contact with the molybdenum disilicide-based ceramic elements.

(9) The molybdenum disilicide-based ceramic heating element holding structure according to (8) above, where electrical insulators are inserted between the respective elements of the molybdenum disilicide-based ceramic to suppress movement of the elements of the molybdenum disilicide-based ceramic, and the electrical insulators have a larger size than the elements of the molybdenum disilicide-based ceramic such that a difference in their levels is made and deformation of the molybdenum disilicide-based ceramic heating element while heated is suppressed.

(10) The molybdenum disilicide-based ceramic heating element holding structure according to (7) above, wherein the plurality of molybdenum disilicide-based ceramic elements are bar or tube-like elements, each pair of adjacent bar or tube-like elements thereof being interposed with an electrical insulator and held together by a bar or tube-like electrically insulating body, the tube-like electrically insulating body.

According to the present invention, the molybdenum disilicide-based ceramic heating element holding structure described above, the molybdenum disilicide-based ceramic heating element holding method corresponding thereto, and specific members used in this heating element holding structure, are provided.

According to the holding structure of the MoSi$_2$-based ceramic heating element of the present invention, the MoSi$_2$-based ceramic heating element alone can be easily exchanged. The total manufacturing cost of the heating element (heater) and the holding structure, and the cost and labor or effort of exchanging the heating element can be reduced. Moreover, in preferred embodiments, it is also easy to exchange the MoSi$_2$-based ceramic heating element while heated to a high temperature. Moreover, according to the present invention, degradation of the support material of the heating element is prevented and the concern of the heating element falling out can be reduced. Moreover, the damage frequency of the MoSi$_2$-based ceramic heating element due to both contraction and expansion during heating up or down to a high and low temperature can be reduced.

DESCRIPTION OF EMBODIMENTS

The molybdenum disilicide (MoSi$_2$)-based ceramic heating element to be used in the present invention is known. A molybdenum disilicide (MoSi$_2$)-based ceramic is a heating element having resistance against a high temperature and an atmosphere, and generally comprises from 50 to 95 vol % of molybdenum disilicide (MoSi$_2$) and 5 to 50 vol % of a silica-based oxide phase or a glass phase, which may further comprise 50 vol % or less of another element, based on the overall volume of the above main components, and/or to which a heat treatment may be applied. Moreover, a composite material of such a molybdenum disilicide (MoSi$_2$)-based ceramic and another ceramic or glass or the like is known, but even such a composite material, if a material has a function as a heating element based on the molybdenum disilicide (MoSi$_2$)-based ceramic, is included in the definition of the molybdenum disilicide (MoSi$_2$)-based ceramic heating element.

Figure 2:
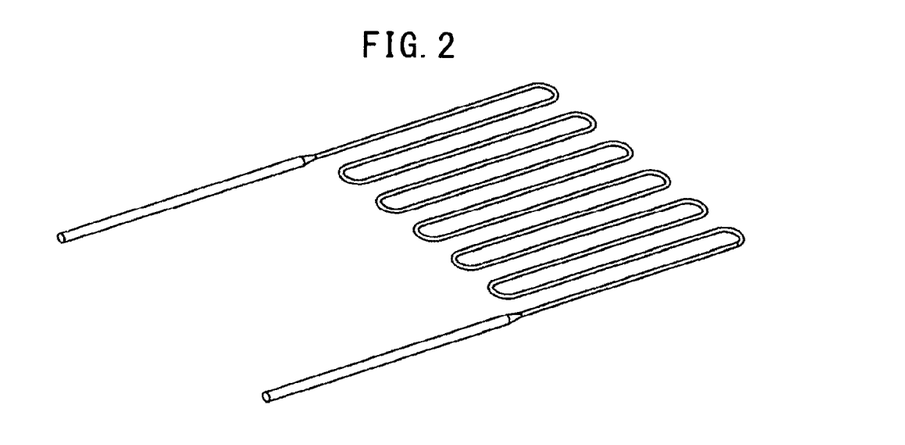
FIG. 2 illustrates an example of a MoSi$_2$-based ceramic heating element.

In the present invention, a shape of a molybdenum disilicide (MoSi$_2$)-based ceramic heating element of an elongated shape is not limited if it is an elongated shape, but a heating element of an elongated shape of a straight line or a curved line, in particular, a meandering shape, is favorably used. An example of a heating element with the meandering shape is illustrated in FIG. 2. A cross-sectional shape of the heating element is preferably a circle but may be a rectangle or another shape.

An elongated support member for mounting the molybdenum disilicide-based ceramic heating element is sufficient if it is an elongated body of a heat-resistant and electrically insulating material, such as a ceramic of an alumina base, a mulite base, a zirconia base, or the like, but as will be described below using FIG. 5, it is preferable to use a molybdenum disilicide-based ceramic in the portion contacting the molybdenum disilicide-based ceramic heating element. The molybdenum disilicide-based ceramic heating element and the molybdenum disilicide-based ceramic used in the elongated support member are preferably of an identical composition but it is sufficient if both are molybdenum disilicide-based ceramics.

The first holding members for holding the elongated support members comprise a heat-resistant material such as the ceramic of the alumina base, the mulite base, the zirconia base, or the like. The first holding members preferably detachablly hold the elongated support members and can typically be of a shape where the elongated support members are suspended by each being inserted through a hole in a plate having the hole (through hole) through which the elongated support members can be inserted, using as the plates a plurality of first holding members.

A second holding member or a base portion of a holding structure is essentially indicative of a holding means that holds the first holding members, and these are not necessarily clearly distinguished from each other. Typically, a heat-insulating material such as a ceramic fiberboard can be mentioned as the second holding member, but the second holding member can be configured as in embodiments that will be described below. The base portion of the holding structure is sufficient if it is the holding structure holding the first holding members or a portion thereof. mainly assumed is a situation where the first holding members are held in a portion of a structure that cannot be called a member, such as a heating furnace or an interior structure thereof, but the base portion may be a member configuring such a holding structure. A material of the second holding member or the base portion of the holding structure is not limited in particular. The ceramic fiberboard of a heat-insulating material is preferably used. Since the first holding member is heat resistant, the second holding structure does not necessarily demand a high heat resistance compared to the first holding member, therefore the second holding structure is not limited to be a ceramic and may be a metal or another material.

A ceramic fiberboard as a heat-insulating material for holding a molybdenum disilicide-based ceramic heating element is known and is a refractory formed by mixing ceramic fibers with an adhesive function material such as a binder, followed by shaping and firing the same.

Embodiments of the holding structure for holding the molybdenum disilicide-based ceramic heating element of the present invention will be described below, but the heating element generally has a connection terminal portion between a heating portion and a power source. In the present invention, the heating portion made of the molybdenum disilicide-based ceramic is mounted to the elongated support members of the holding structure of the present invention, but the connection terminal portion may lead to a low-temperature atmosphere portion outside the heating furnace or can be supported by a heat-resistant support member such as a ceramic. However, a support method and an electrical connection method of the connection terminal portion are not limited in particular.

First Embodiment

Figure 3A:
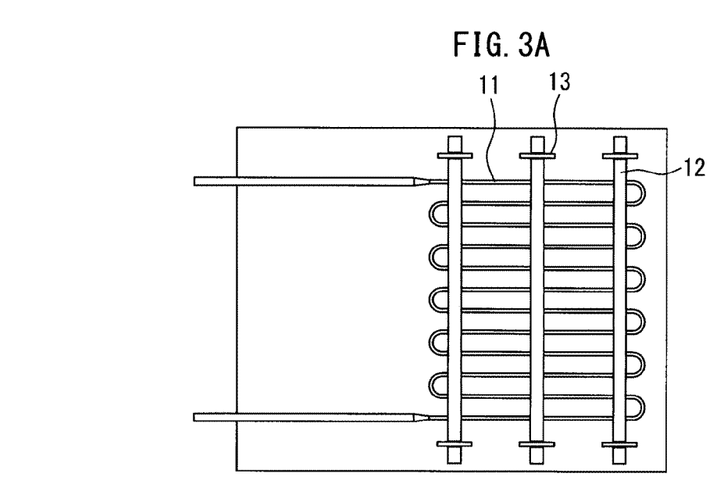
FIGS. 3A-3C illustrate a first embodiment of the present invention.
Figure 3B:
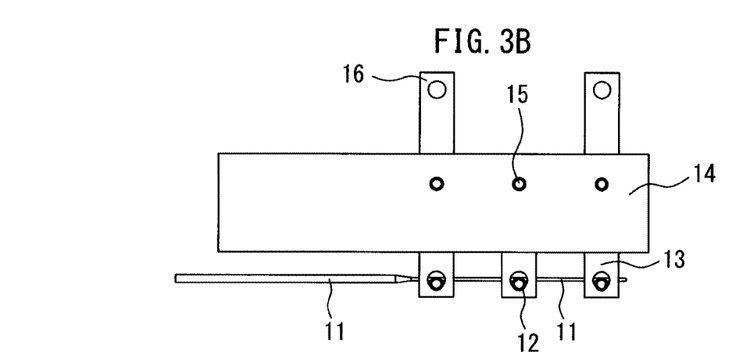
Figure 3C:
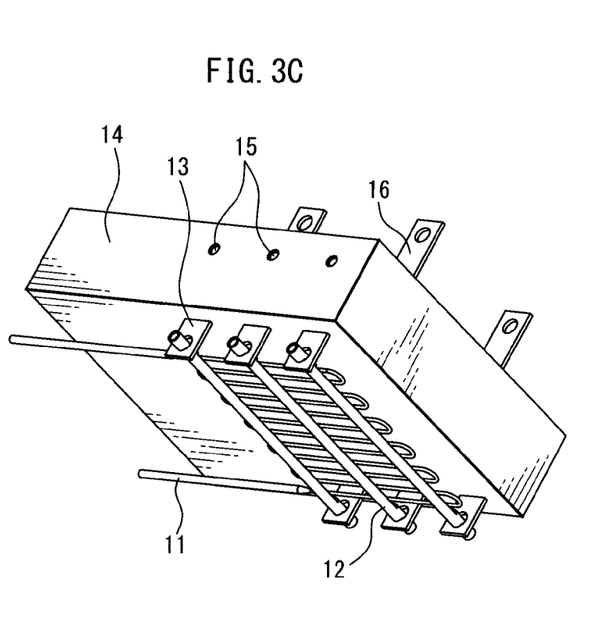

A first embodiment is illustrated in FIGS. 3A-3C. This embodiment is an example suited to hold a heating element (11) of a meandering shape illustrated in FIG. 2. This heating element (11) meanders back and forth six times.

The heating element (11) is of a form that traverses ceramic tubes (12) disposed in parallel at predetermined intervals as an elongated holding means and is mounted on three ceramic tubes (12). Since a gap the heating element (11) is held at by ceramic tubes (12) is decided upon considering a high-temperature strength of the molybdenum disilicide-based ceramic heating element, the number of ceramic tubes (12) is decided as a result thereof.

Figure 5:
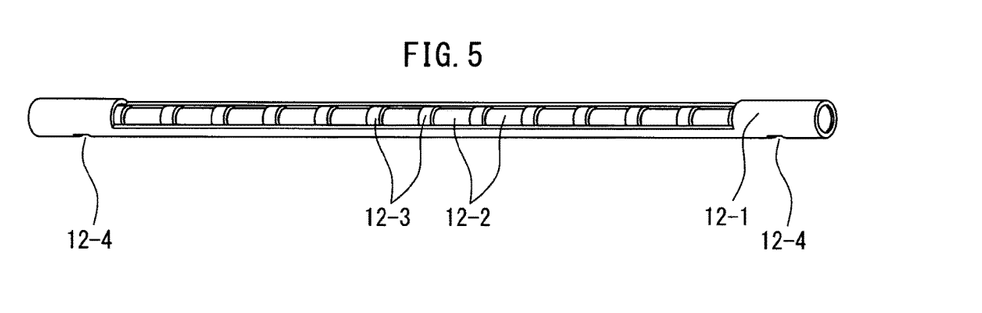
FIG. 5 illustrates a structure and component examples of an elongated ceramic holding member.
Figure 6A:
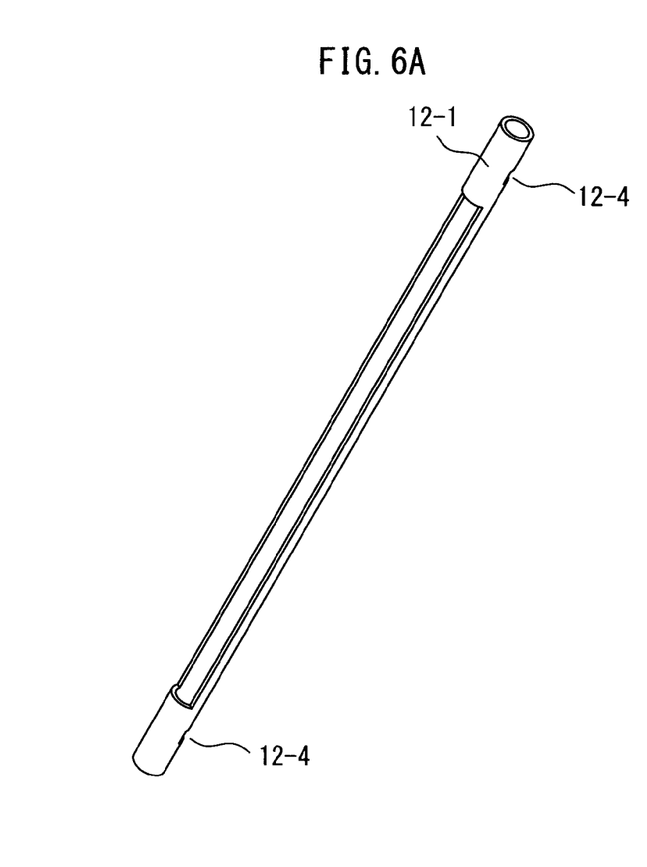
FIGS. 6A-6B illustrate an example of a ceramic tube.
Figure 6B:
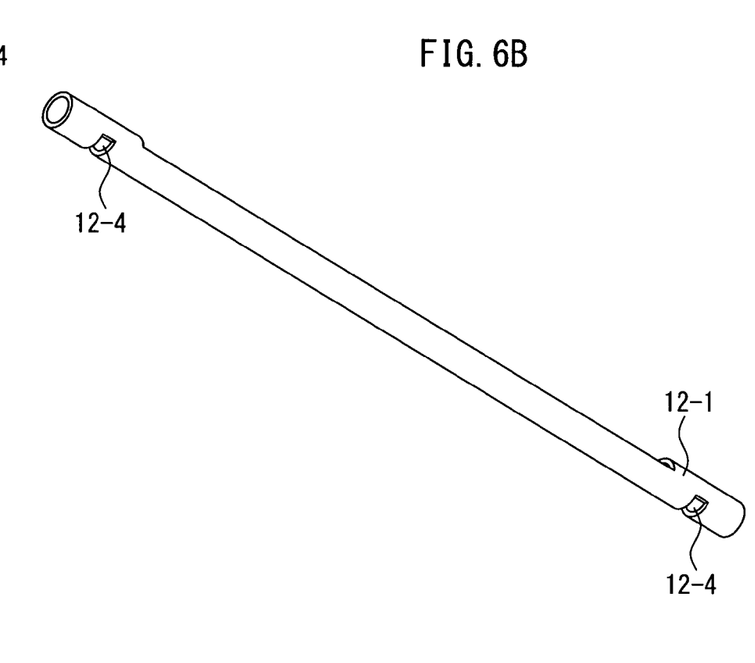

The ceramic tubes (12) are made of a heat-resistant ceramic such as alumina but, as will be described below with reference to FIGS. 5 to 6, is preferably a ceramic tube that houses a molybdenum disilicide-based ceramic element in a portion contacting the molybdenum disilicide-based ceramic heating element.

The ceramic tubes (12) are inserted through holes (through holes) provided in ceramic plates (13), which are the first holding members, and are held (suspended) at a predetermined interval by the ceramic plates (13). In FIG. 3, two ceramic plates are used for holding, but there can be four or six ceramic plates (13), for example, when holding a same heating element. It is also sufficient to decide the number of ceramic plates upon consideration of the high-temperature strength. The ceramic tubes (12) are inserted through the holes provided in the ceramic plates (13), but since the size of the holes is larger than the outer diameter of the ceramic tubes (12), the ceramic tubes (12) are freely detachable from the ceramic plates (13).

The ceramic plates (13) are made from a heat-resistant ceramic such as alumina.

Even if the ceramic tubes (12) are held in a form that is not detachable from the ceramic plates (13), it is within the scope of the present invention if the heating element (11) can be inserted and extracted from a uniaxial direction in a partitioned or defined space(s) formed by the ceramic tubes (12), the ceramic plates (13) and the ceramic fiberboard (14) since the heating element can be independently taken out from the heating element holding structure and exchanged. In order to be able to insert and extract the heating element (11) from the uniaxial direction in the partitioned or defined space(s) formed by the ceramic tubes (12), the three or more ceramic plates (13) and the ceramic fiberboard (14), it is typically sufficient for one or more U-shaped portions of the heating element of the meandering shape to each be able to be inserted and extracted in each space definned or partitioned by the ceramic plates described above. However, detachablly holding the ceramic bars (12) from the ceramic plates (13) is preferable.

The ceramic plates (13) can be fixedly held or can also be held in a somewhat movable state by a heat-insulating material (the second holding member or the base portion of the holding structure) called the ceramic fiberboard (14). A method for holding so as to be somewhat movable is not limited, but the ceramic plates (13) can also be held in a somewhat movable manner by, for example, providing in the ceramic fiberboard 14 slots of a size such that the ceramic plates (13) are somewhat movable, inserting in these slots the ceramic plates (13), and appropriately holding the ceramic plates (13) above the ceramic fiberboard (14), or by somewhat movably holding the ceramic plates (13) by passing shafts (ceramic tubes) through the ceramic fiberboard (14).

In order to hold the ceramic tubes by passing through the ceramic fiberboard (14), the ceramic plates (13) have an end portion with a first hole (through hole) that passes the ceramic tube (12) through and a second hole (through hole) on an end portion on an opposite side.

The ceramic fiberboard (14) has slots perpendicular to a board top surface for inserting the ceramic plates (13) and holes provided in the ceramic fiberboard (14) so as to pass second ceramic tubes (15) through second holes of the ceramic plates (13) inserted into these perpendicular slots. The ceramic plates (13) are held by passing the second ceramic tubes (15) through the second holes of the ceramic plates (13) inserted into the slots in a direction perpendicular to the ceramic fiberboard (14).

A material and manufacturing method of the ceramic fiberboard are described above. A heat-resistant ceramic material such as alumina can also be used as a second ceramic tube.

In FIGS. 3A-3C, second plates (16) are attached on an opposite side of a heating element holding side of the ceramic fiberboard (14). Since a heat-insulating material is interposed between the second plates (16) and the heating element, the second plates (16) do not need to be a ceramic plate similar to the ceramic plates (13) on a heating element (11) holding side and may be made of a metal. It is sufficient for the second plates (16) to be installed in a position appropriate for attaching the ceramic fiberboard (14) to a ceiling or the like of the heating furnace.

The ceramic tubes (12) can be held pendent by being passed through a first hole of the ceramic plates (13) after (or before) installing the ceramic fiberboard (14) in the heating furnace.

A configuration, where the ceramic bars (12) are attached to the ceramic fiberboard (14) with the ceramic plates (13), can be used as a heating element holding structure unit and easily be installed in a furnace or the like to construct the heating furnace.

In FIGS. 3A-3C, in a molybdenum disilicide-based ceramic heating element holding unit to be installed in the heating furnace, the heating element (11) can be inserted in the uniaxial direction in the heating element holding unit and mounted on the ceramic tubes (12) by inserting the heating element (11) above the ceramic tubes (12). Moreover, therefore, in this situation, the heating element (11) can be pulled out in the uniaxial direction from the heating element holding structure unit. When the number of ceramic plates (13) is three or more, it is sufficient to insert one or more of the U-shaped portions of the heating element (11) between the ceramic plates (13) (this enables the heating element to be inserted and extracted in the uniaxial direction).

Therefore, in this heating element holding structure, the molybdenum disilicide-based ceramic heating element can be easily equipped to the heating element holding unit (16), and when the heating element is damaged, the heating element (11) alone can be easily removed from the heating element holding unit (16) and exchanged. Therefore, since the heating element of this heating element holding structure can be pulled out easily from the uniaxial direction, the heating element can be exchanged while heated without cooling the heating furnace.

Note that using the ceramic bars (15) in attaching the ceramic plates (13) to the ceramic fiberboard (14) is not necessary. For example, the ceramic plates may be held by an appropriate means above the ceramic fiberboard (14) by providing a groove(s) that passes through the ceramic fiberboard (14) and inserting the ceramic plates therein or by making an end portion on an opposite side of the first holes of the ceramic plates (13) to be an appropriate shape and merely embedding and fixing this end portion in the ceramic fiberboard (14). The ceramic fiberboard (14) is the second holding member, but it is also possible to consider it to be a base portion of the heating element holding structure.

Furthermore, the ceramic plates (13) may be movably fixed, for example, by inserting, and using as an axis, the ceramic bars through the second holes of the ceramic plates (13), so that stress leading to damage can be mitigated by the ceramic tubes (12) moving freely and following a movement such as thermal contraction of the heating element.

Figure 4:
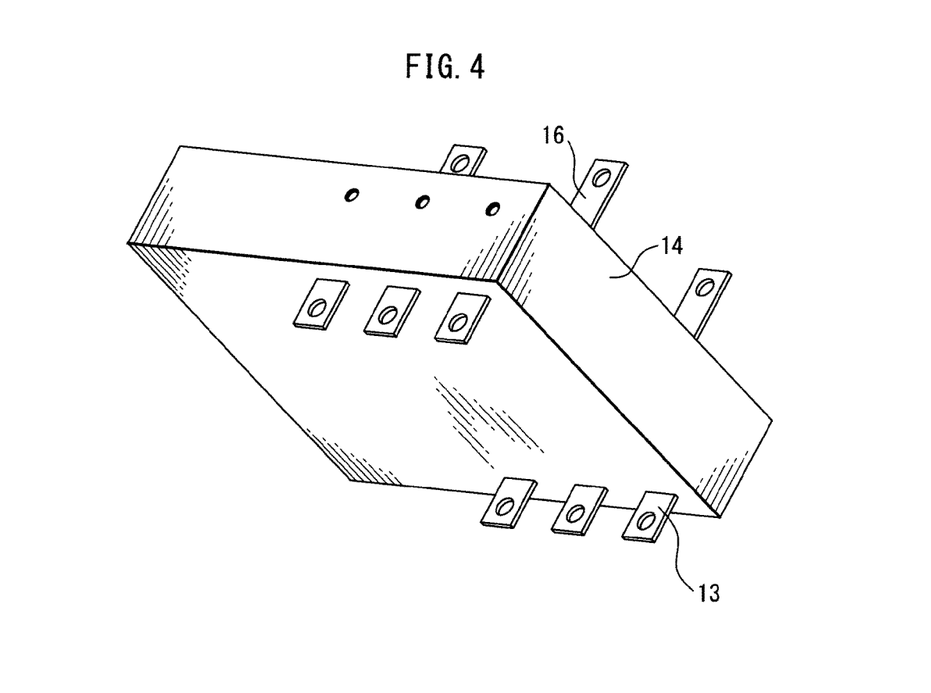
FIG. 4 illustrates a state of a heating element holding unit where ceramic bars are removed therefrom.

Furthermore, in the first embodiment, since the ceramic tubes (12) are held so as to be detachable from the first holes of the ceramic plates (13), if the ceramic tubes (12) are pulled out from the first holes of the ceramic plates (13), the ceramic plates (13) are held perpendicular to a top surface of the ceramic fiberboard (14), as illustrated in FIG. 4.

Therefore, the heating element (11) mounted on the ceramic tubes (12) disposed between these ceramic plates (13) can be removed easily in the perpendicular direction to the top surface of the ceramic fiberboard (14) if the ceramic tubes (12) are pulled out from the ceramic plates (13). In this situation, when the ceramic tubes (12) are held in the first holes of the ceramic plates (13), the heating element (11) alone can be easily removed from the heating element holding structure and exchanged by removing the ceramic tubes (12) even when the heating element (11) is disposed intersecting the ceramic plates (13) so that the heating element (11) cannot be pulled out in the uniaxial direction in a direction parallel to the top surface of the ceramic fiberboard (14).

Elongated Heating Element Support Member

While not limited to the first embodiment, a preferred aspect of the ceramic tube (12) as the elongated heating element support member in the present invention is illustrated in FIG. 5. The elongated heating element support member may comprise a heat-resistant and insulating ceramic such as alumina, but making the portion of the elongated heating element support member contacting the molybdenum disilicide-based ceramic heating element a molybdenum disilicide-based ceramic similar to the material of the heating element is preferable since the reactivity may be remarkably reduced.

However, when the elongated heating element support member comprises a molybdenum disilicide-based ceramic of a material similar to the molybdenum disilicide-based ceramic heating element, the elongated heating element support member may be short-circuited due to its relatively low electrical resistivity. Therefore, it is preferred that the elongated support members comprises a plurality of molybdenum disilicide-based ceramic elements between which electrical insulators are interposed, the molybdenum disilicide-based ceramic heating element being mounted in such a manner as to contract with the molybdenum disilicide-based ceramic elements. Here, the electrical insulators are preferably made of a heat-resistant and insulating ceramic such as alumina or silica.

The elongated heating element support member illustrated in FIG. 5 is a heat-resistant and insulating ceramic tube (12-1) made of alumina, silica or the like, has an opening portion on one side of the tube, and can house elements (short cylinders) (12-2) made from molybdenum disilicide-based ceramic of a material similar to the molybdenum disilicide-based ceramic heating element. It is preferable that elements (short cylinders) (12-3) made from the heat-resistant and insulating ceramic such as alumina or silica are disposed between pairs of molybdenum disilicide-based ceramic elements (12-2) housed in the opening portion of the ceramic tube (12-1) such that the molybdenum disilicide-based ceramic elements (12-2) are insulated from each other.

These heat-resistant and insulating ceramic elements (12-3) have a shape of a short cylinder or a column, similar to the molybdenum disilicide-based ceramic elements (12-2), and can be housed between pairs of the molybdenum disilicide-based ceramic elements (12-2) in the opening portion of the ceramic tube (12-1). If the insulating ceramic elements (12-3) have a larger diameter than and are higher compared to the molybdenum disilicide-based ceramic elements (12-2) and have a difference in levels, an effect of preventing shifting and deformation of the heating element while heated can be obtained.

Furthermore, the heat-resistant and insulating ceramic elements (12-3) may be formed integrally with the ceramic tube (12-1), and elements (12-2) made from the molybdenum disilicide-based ceramic be insulated from each other by housing the elements (12-2) made of the molybdenum disilicide-based ceramic in opening portions present between these elements (12-3) made of the heat-resistant and insulating ceramic. Alternatively, if the elements (12-2) made from the molybdenum disilicide-based ceramic (12-2) are stabilized or fixed in opening portions of the heat-resistant and insulating ceramic tube (12-1) so as not to directly contact each other, the heat-resistant and insulating ceramic elements (12-3) are not needed between the heat-resistant and insulating ceramic elements (12-3).

By housing and holding a plurality of molybdenum disilicide-based ceramic elements (12-2) in the heat-resistant and insulating ceramic tube (12-1), it becomes possible to prevent the molybdenum disilicide-based ceramic heating element (11) from contacting the elongated heating element support members (ceramic or tubes) (12) made of alumina, silica or the like and reacting at a high temperature, which is favorable. Since the molybdenum disilicide-based ceramic lacks strength and softens at a high temperature, it is not recommendable to be used as a main body of the elongated heating element support members (ceramic bars or tubes) (12) that are the support members of the molybdenum disilicide-based ceramic heating element (11); however, because there is concern that the ceramic such as alumina or silica will react with the molybdenum disilicide-based ceramic heating element when it reaches a high temperature at a contact portion therebetween, a molybdenum disilicide-based ceramic of a low reactivity is used only in this contact portion, and by holding the molybdenum disilicide-based ceramic in a ceramic tube of alumina, silica or the like that excels the molybdenum disilicide-based ceramic in the high-temperature strength, a high-temperature strength as of the elongated heating element support member is attained.

However, since the molybdenum disilicide-based ceramic is of a material similar to the heating element and therefore displays a conductivity at a high temperature, holding the molybdenum disilicide-based ceramic heating element (11) by the molybdenum disilicide-based ceramic causes the molybdenum disilicide-based ceramic heating element (11) to be short-circuited; elements of the molybdenum disilicide-based ceramic each contacting the molybdenum disilicide-based ceramic heating element (11) need to be electrically insulated by. Therefore, a plurality of molybdenum disilicide-based ceramic elements (12-2) are housed and held in the heat-resistant and insulating ceramic tube (12-1), and the heat-resistant and insulating ceramic elements (12-3) are disposed between elements (12-2) made of the molybdenum disilicide-based ceramic respectively.

Therefore, as a rule, for electrical insulation, the number of molybdenum disilicide-based ceramic elements (12-2) preferably coincides with or is greater than the number of locations (the number of heating elements that meander back and forth) the molybdenum disilicide-based ceramic elements (12-2) contact the molybdenum disilicide-based ceramic heating element (11) held by the elongated heating element support member (ceramic bar) (12). In FIG. 5, the number of elements (12-2) made of the molybdenum disilicide-based ceramic is twelve. However, the number of elements (12-2) made of the molybdenum disilicide-based ceramic may be decreased to be less than twelve by culling to make contact with only a portion of the heating element.

The heat-resistant and insulating ceramic tube (12-1), the molybdenum disilicide-based ceramic elements (12-2) and the heat-resistant and insulating ceramic elements (12-3) are shaped as cylindrical tubes and cylindrical elements in FIG. 5, but it is clear that these are not limited to a cylindrical shape. For example, they may be bars, tubes or columnar bodies of a square, hexagonal, elliptical, or boat-formed cross-sectional shape.

Furthermore, if the heat-resistant and insulating ceramic tube (12-1) is a tube of a cylindrical shape, when it is inserted through the hole of the ceramic plate (13), there are concerns that the ceramic tube (12-1) will be shifted in a length direction and that the molybdenum disilicide-based ceramic elements (12-2) that are housed in the ceramic tube (12-1) rotated in a cross-sectional direction or the heat-resistant and insulating ceramic element (12-3) will fall out from the tube (12-1). Therefore, as illustrated in FIGS. 6A-6B, it is preferable to provide grooves (12-4) of a shape that is stably held in the hole of the ceramic plate (13) on a lower surface side of the heat-resistant and insulating ceramic tube (12-1).

Figure 7A:
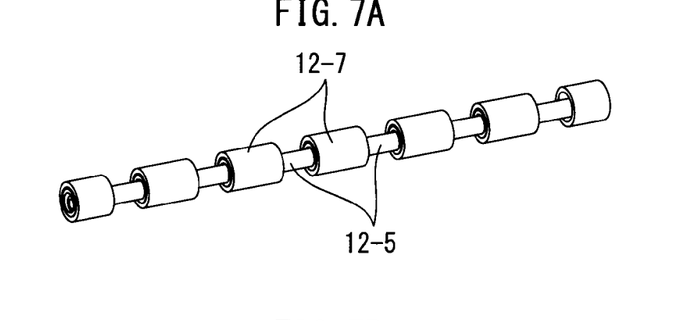
FIGS. 7A-7B illustrate another example of an elongated ceramic holding member.
Figure 7B:
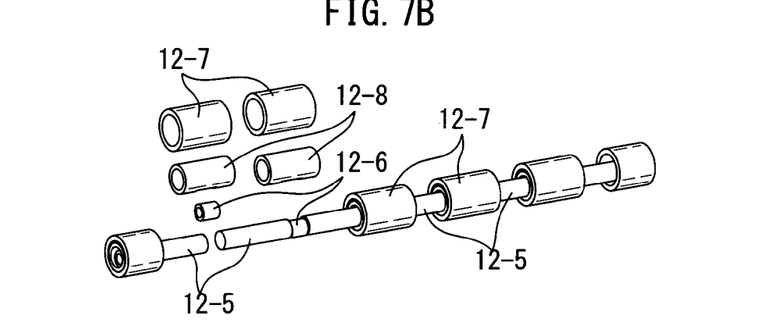

FIGS. 7A and 7B show another example of the elongated heating element support member, in which FIG. 7A is a perspective view and FIG. 7B is a partially exploded view. Referring to FIGS. 7A and 7B, the elongated heating element support member comprises bar or tube-like molybdenum disilicide-based ceramic elements (12-5), cylindrical rods in the figure, interposed with an insulator of a heat resistant and insulating ceramic such as alumina (12-6), a cylindrical tube or rod in the figure, between each pair of adjacent bar or tube-like molybdenum disilicide-based ceramic elements (12-5). Each pair of adjacent elements of the bar or tube-like molybdenum disilicide-based ceramic elements (12-5) are held together by a heat resistant and insulating body (12-7), a cylindrical ceramic tube in the figure. Thus, the bar or tube-like molybdenum disilicide-based ceramic elements (12-5) are electrically insulated therebetween.

The elongated heating element support member preferably comprises heat resistant and insulating bodies (12-7) at both ends thereof from a strength view point. Referring to FIG. 7B, each of the heat resistant and insulating bodies (12-7) comprises two layer tubes in this example, but may comprise one layer tube or three or more layer tubes. The bar or tube-like molybdenum disilicide-based ceramic elements (12-5), the insulators (12-6) and the heat resistant and insulating bodies (12-7) may be bonded together at interfaces between all or parts of them with an adhesive. The insulators (12-6) between the bar or tube-like molybdenum disilicide-based ceramic elements (12-5) may be eliminated if the bar or tube-like molybdenum disilicide-based ceramic elements (12-5) are securely separated with a space between them.

Figure 7C:
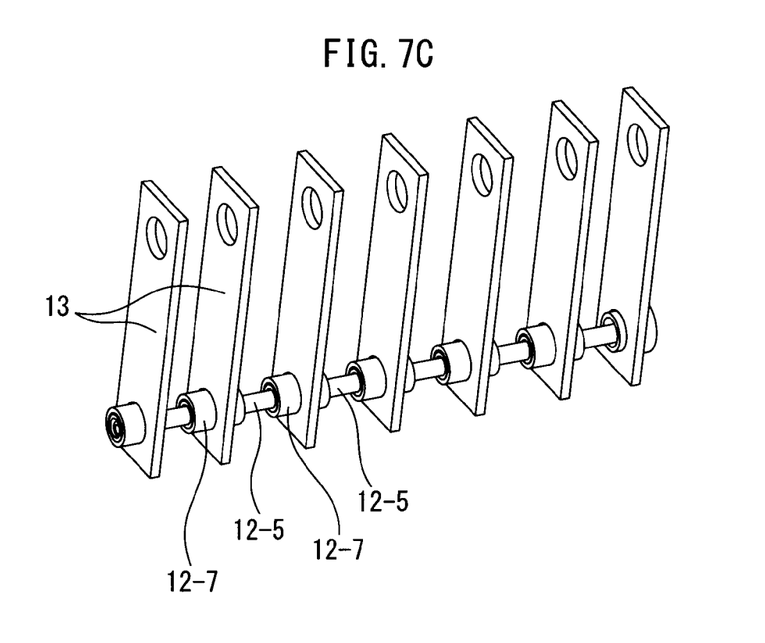
FIG. 7C illustrates an example of the way of holding the elongated ceramic holding member as shown in FIGS. 7A and 7B.

FIG. 7C shows the elongated heating element support member shown in FIGS. 7A and 7B held by a number of ceramic plates 13. It is preferred that the elongated heating element support member shown in FIGS. 7A and 7B are held at as many as possible, particularly all if possible, of portions of the heat resistant and insulating bodies (12-7) by a number of ceramic plates 13 from a strength view point. Incidentally, the elongated heating element support member 12 shown in FIGS. 3 and 4 are held only at both ends thereof by ceramic plates 13, but may be held at more portions of the elongated heating element support member 12 as shown in FIG. 7C

Second Embodiment

Figure 8A:
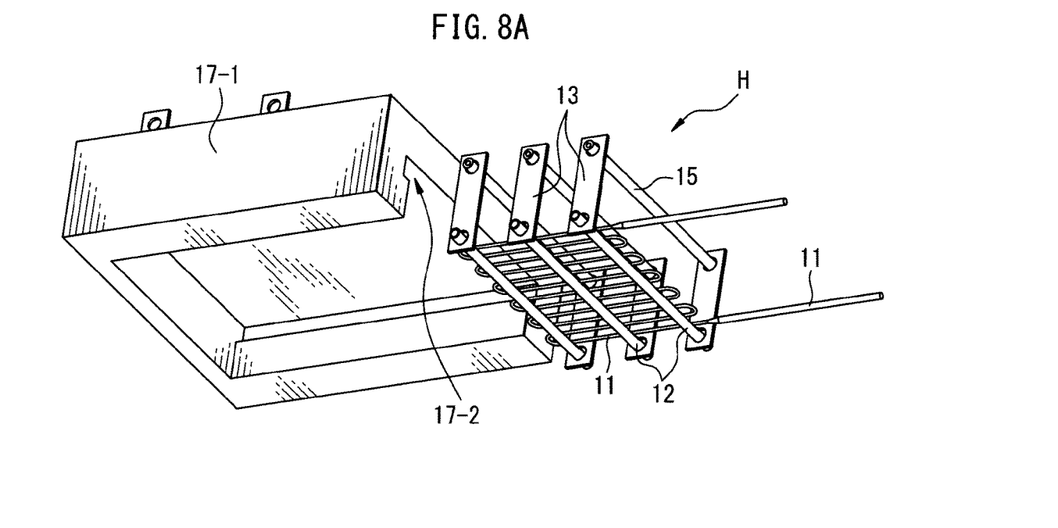
FIGS. 8A-8B illustrate a second embodiment of the present invention.

FIG. 8A shows a structure identical to the heating element holding structure illustrated in FIGS. 3A-3C with respect to the ceramic tubes (12) (here referred to as first ceramic tubes) being suspended and held by the ceramic plates (13). The ceramic plates (13) have a second hole on the end portion on an opposite side besides a hole (referred to here as the first hole) for holding the first ceramic tube (12), passes the second ceramic tube (15) through the second hole of the ceramic plate (13) holding the first ceramic tube, and holds the ceramic plate (13) with the second ceramic tube (15).

The first ceramic tubes (12) are also preferably of a structure illustrated in FIGS. 5 to 7B.

The heating element holding structure H is formed, by using two ceramic plates (13), a first ceramic tube (12) and second ceramic tube (15) as one set and disposing three of such sets in a manner that the first ceramic tubes (12) and the second ceramic tubes (15) are parallel. If there are two or more ceramic plates (13) each holding first ceramic tube (12), it is preferable to hold (two or more sets of) the ceramic plates (13), each holding the first ceramic tube (12), using the second ceramic tubes (15).

Respective members configuring this heating element holding structure H do not need to be bonded strongly to each other. Since they are used at a high temperature, it is preferable, rather, that there is a gap in an engagement portion (that they are movable) in consideration of thermal expansion. From a viewpoint of operability it is preferable that these members are self-supporting when assembled, but being self-supportable is not necessary during use because the members are basically held pendent by the holding structure.

Figure 8B:
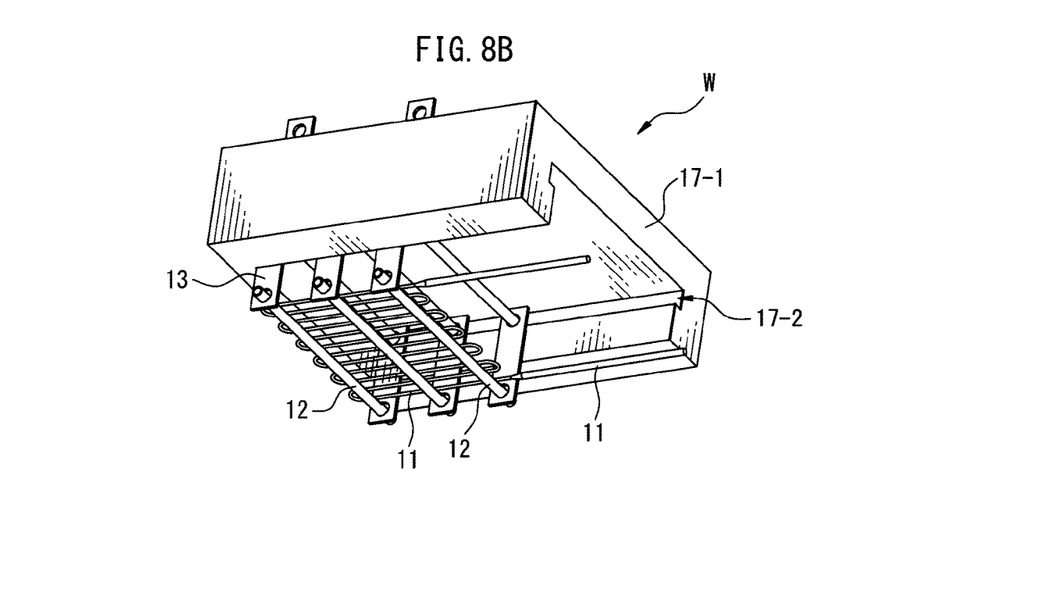

The heating element (11) is of a meandering shape, six U-shaped portions formed by the heating element meandering back and forth are present therein, and the heating element (11) can be inserted between the ceramic plates (13). Here as well, if the number of ceramic plates (13) is three or more, it is sufficient to insert one or more of these U-shaped portions between two of the ceramic plates (13) (the heating element can be inserted and extracted in the uniaxial direction). By using an appropriate jig to lift the second ceramic tubes (15) from below, the entire structure H is lifted; in a state where the first ceramic tubes (12) and the ceramic plates (13) are pendent, a heating element holding structure W such as illustrated in FIG. 8B can be formed by fitting both end portions of the second ceramic tubes (15) in grooves (17-2) formed on an inner side of a frame body (17-1) formed by the ceramic fiberboard. With this heating element holding structure W (H), it is possible to consider the second holding member as being configured by an entirety of the second ceramic tubes (15) and the frame body (17-1), but it is also possible to consider only the second ceramic tubes (15) as the second holding member.

The heating element holding structure W including this frame body (17-1) can form the heating furnace by using structure W as a unit, similar to as in the first embodiment. In this unit, the heating element (11) alone may be pulled out in the uniaxial direction (the right direction in the drawing), or the heating element (11) or an appropriate jig may be used to pull out and remove the second ceramic tubes (15), or an entire structure H, while the ceramic tubes (12) and the ceramic plates (13) are held pendent, from the grooves (17-2) of the frame body (17-1).

This heating element holding structure H can easily be removed from the frame body and can therefore be exchanged as a unit while heated without cooling the heating furnace. Moreover, since the heating element can be easily pulled out in the uniaxial direction, the heating element can be exchanged while heated without cooling the heating furnace.

Furthermore, in FIGS. 8A and 8B, the heating element (11) can be inserted and extracted from the uniaxial direction to the heating element holding structure W. Moreover, the heating element holding structure H held by the second ceramic tubes (15) and taken out from the frame body (17-1) can be disassembled by pulling out the first ceramic bars (12) or the second ceramic tubes (15) from the holes of the ceramic plates (13). Therefore, exchanging the heating element is easy even when the number of ceramic plates (13) is increased and the heating element is disposed on the first ceramic bars 12 so as to intersect the ceramic plates (13) (not illustrated). After exchanging the heating element, by returning the first ceramic tubes (12) or the second ceramic tubes (15) to the holes of the ceramic plates (13), the heating element disposed intersecing the first ceramic tubes (12) can be held by being mounted on the first ceramic tubes (12). The heating element holding structure H assembled in this manner can also be held by being inserted into the grooves (17-2) of the frame body (17-1).

The frame body (17-1) can use a formulation similar to that of the ceramic fiberboard to be manufactured by forming and firing.

Third Embodiment

Figure 9A:
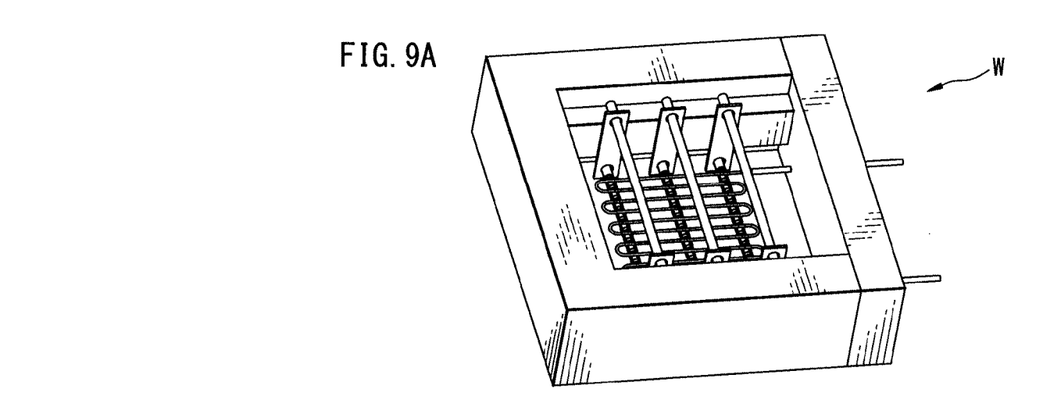
FIGS. 9A-9B illustrate a third embodiment of the present invention.
Figure 9B:
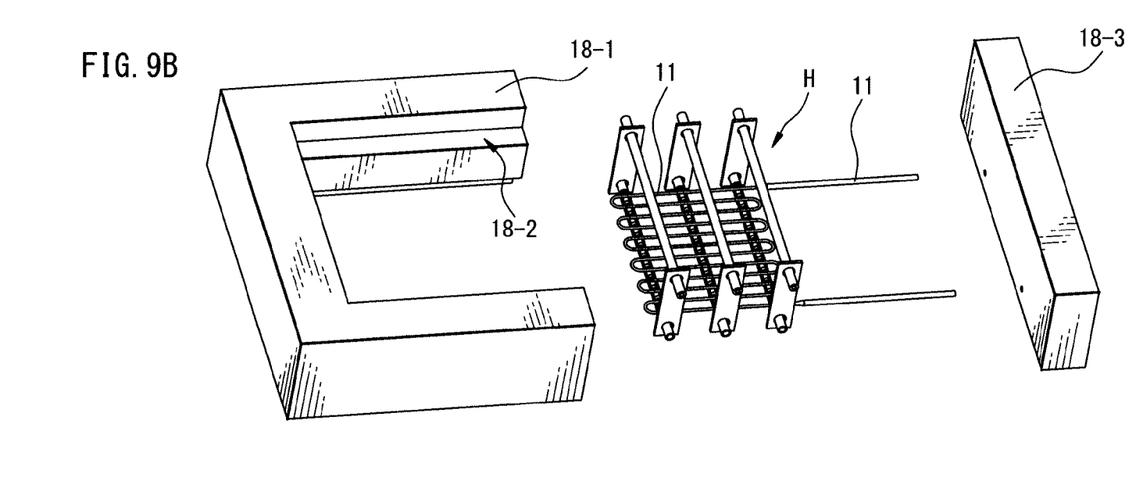

FIG. 9 shows a structure identical to the heating element holding structure W illustrated in FIGS. 8A and 8B except in the frame body being frame bodies (18-1) and (18-3) that open in both an upward and a downward direction.

Since this heating element holding structure W opens in both the upward and the downward directions, it is possible to heat in the heating furnace in both the upward and the downward directions by disposing the heating element not on the ceiling of the heating furnace but in a central area of the heating furnace. By heating in the heating furnace in both the upward and the downward directions, rapid heating in the heating furnace is enabled, as compared to heating from the ceiling.

The heating element holding structure H configured without this frame body can be easily removed from the frame body (18-1), which enables exchanging the heating element holding structure H as a unit while heated without cooling the heating furnace. Moreover, in the embodiment illustrated in FIG. 9, in the heating element holding structure W as well, which includes the frame body, the heating element (11) alone can be easily pulled out from the uniaxial direction after removing a portion (18-3) of the frame body, thus enabling exchanging the heating element while heated without cooling the heating furnace.

Fourth Embodiment

Figure 10:
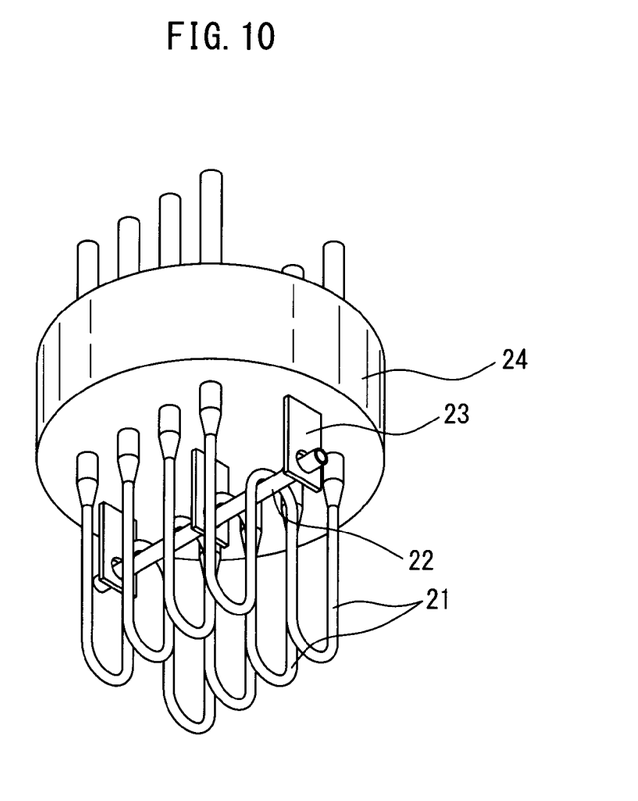
FIG. 10 illustrates a fourth embodiment of the present invention.

FIG. 10 shows a structure identical to the first embodiment with respect to ceramic plates (23) being attached to a ceramic fiberboard (24) and a ceramic tube (22) being inserted through holes provided in the ceramic plates (23).

However, in this embodiment, heating elements (21) are attached by inserting through holes provided in the ceramic fiberboard (24), the heating elements (21) have a meandering shape in a vertical direction, and an upper end portion of this meandering shape (U-shaped portion) is held by being mounted to one ceramic bar (22). In FIG. 10, the meandering shape meanders back and forth two times, but it is also possible for the meandering shape to meander back and forth three or four times and the upper end portion of this meandering shape (U-shaped portion) to be held by-mounting not to the one ceramic tube (22) but to a plurality of ceramic tubes (22). It is also preferable for this ceramic tube (22) to have a structure illustrated in FIGS. 5 to 7B.

This heating element holding structure can hold the heating elements by passing the ceramic tube (22) through the holes of the ceramic plates (23) and take out and exchange the heating elements by pulling them out from the holes of the ceramic plates (23). Moreover, it is also possible to pull out the ceramic plates (23) with the heating elements to a lower side by pulling out the second ceramic tube penetrated through and disposed inside a heat-insulating material (24).

Figure 11:
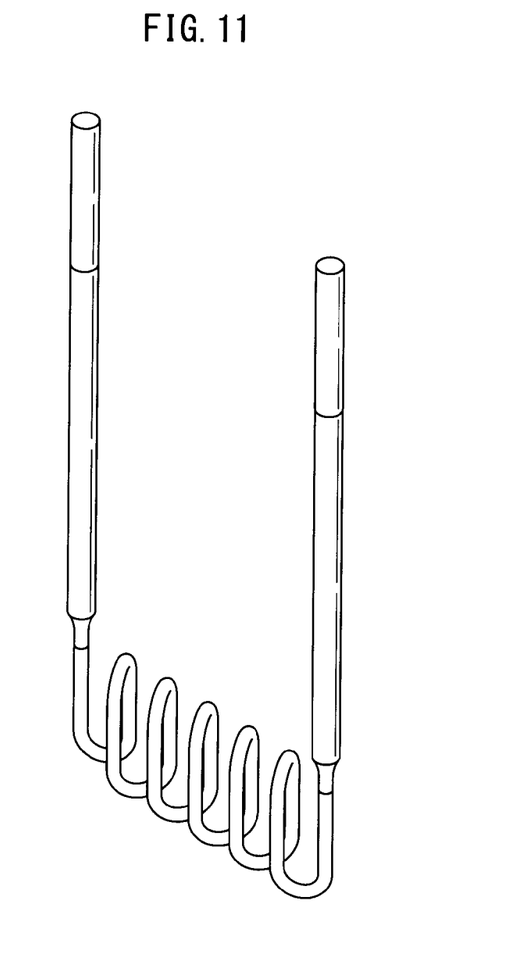
FIG. 11 illustrates a modified embodiment of the fourth embodiment of the present invention.

Furthermore, in the embodiment illustrated in FIG. 10, the heating element can be changed to have a shape such as illustrated in FIG. 11. That is, having one and not four heating elements, but the heating portion being of a spiral shape.

The invention claimed is:

1. A molybdenum disilicide-based ceramic heating element holding structure, comprising:
   one or more elongated support members arranged to support a molybdenum disilicide-based ceramic heating element having an elongated shape by mounting the molybdenum disilicide-based ceramic heating element at locations along a long axis direction thereof; and
   a plurality of first holding members for holding each elongated support member at two or more locations in a long axis direction of each elongated support member,
   wherein the plurality of first holding members are held by one or more second holding members or held by a base portion of a holding structure, the elongated molybdenum disilicide-based ceramic heating element being exchangeably mounted on the elongated support member so as to be exchanged without breaking a heating element holding structure,
   wherein the elongated support members include a plurality of molybdenum disilicide-based ceramic elements located along a length of the elongated support member, successive molybdenum disilicide-based ceramic elements separated by an electrical insulator,
   wherein a location of the successive molybdenum disilicide-based ceramic elements along the length of the elongated support member coincides with a location where the elongated support member supports the molybdenum disilicide-based ceramic heating element, and
   wherein, at locations where the elongated support member supports the molybdenum disilicide-based ceramic heating element, the molybdenum disilicide-based ceramic heating element are directly contacted by the molybdenum disilicide-based ceramic elements.

2. The molybdenum disilicide-based ceramic heating element holding structure according to claim 1, wherein a plurality of the elongated support members are provided, the elongated molybdenum disilicide-based ceramic heating element being exchangeablly held without breaking the heating element holding structure by being arranged to removably receive a U-shaped portion of an elongated molybdenum disilicide-based ceramic heating element having a meandering shape from a uniaxial direction in a space defined by the base portion or the second holding member, the plurality of elongated support members and the plurality of first holding members.

3. The molybdenum disilicide-based ceramic heating element holding structure according to claim 2, wherein each of the elongated support members is detachablly held by the first holding members, and by detaching the elongated support members from the first holding members, the elongated molybdenum disilicide-based ceramic heating element arranged to be exchanged without breaking the holding structure.

4. The molybdenum disilicide-based ceramic heating element holding structure according to claim 1, wherein is a frame body opened in both upward and downward, the frame body being heated by the elongated molybdenum disilicide-based ceramic heating element mounted to the elongated support member in both the upward and the downward directions.

5. The molybdenum disilicide-based ceramic heating element holding structure according to claim 1, wherein the second holding members have an elongated shape, and the plurality of first holding members holding each of the plurality of elongated support members are held in series by the second holding members of the elongated shape.

6. The molybdenum disilicide-based ceramic heating element holding structure according to claim 5, wherein a frame body opened in at least an upward downward direction is provided separately from the second holding members, the second holding members being held in the frame body, the at least one direction of the frame body is arranged to be heated by the elongated molybdenum disilicide-based ceramic heating element mounted to the elongated support members, and the second holding members can be removed from the frame body together with the first holding members and the elongated support members.

7. The molybdenum disilicide-based ceramic heating element holding structure according to claim 1, wherein the elongated support members each are an elongated support member made of an electrically insulating ceramic that houses the plurality of molybdenum disilicide-based ceramic elements and electrical insulators.

8. The molybdenum disilicide-based ceramic heating element holding structure according to claim 7, wherein the electrical insulators are inserted between molybdenum disilicide-based ceramic elements to suppress movement of the molybdenum disilicide-based ceramic elements, the electrical insulators having a larger size than the molybdenum disilicide-based ceramic elements such that there is a difference in their levels and deformation of the molybdenum disilicide-based ceramic heating element while heated is suppressed.

9. The molybdenum disilicide-based ceramic heating element holding structure according to claim 1, wherein the plurality of molybdenum disilicide-based ceramic elements are bar or tube-like elements, wherein each pair of adjacent bar or tube-like elements and separating electrical insulator are held together by a bar or tube-like electrically insulating body, and wherein the elongated support members are held at portions of the tube-like electrically insulating bodies by the first holding members.

10. The molybdenum disilicide-based ceramic heating element holding structure according to claim 7, wherein the elongated support members include grooves having a shape that is stably held in a hole of the first holding members.

11. The molybdenum disilicide-based ceramic heating element holding structure according to claim 1, wherein a composition of the molybdenum disilicide-based ceramic heating element and a composition of the molybdenum disilicide-based ceramic elements are identical.

* * * * *